(12) United States Patent
Moulsley

(10) Patent No.: US 6,470,006 B1
(45) Date of Patent: Oct. 22, 2002

(54) TIMING CONTROL OF TRANSMISSION TIME SLOT

(75) Inventor: Timothy J. Moulsley, Caterham (GB)

(73) Assignee: Koninklijke Philips Electronics N.V. (NL)

( * ) Notice: Subject to any disclaimer, the term of this patent is extended or adjusted under 35 U.S.C. 154(b) by 0 days.

(21) Appl. No.: 09/264,060

(22) Filed: Mar. 8, 1999

(30) Foreign Application Priority Data

Mar. 20, 1998 (GB) ............................................ 9805860

(51) Int. Cl.[7] .............................. H04B 7/212; H04J 3/00
(52) U.S. Cl. .................. 370/347; 370/376; 370/395.4; 370/461; 370/468; 370/470
(58) Field of Search ............................. 370/376, 395.4, 370/508, 521, 347, 280, 336, 389, 329

(56) References Cited

U.S. PATENT DOCUMENTS

| | | | | |
|---|---|---|---|---|
| 4,972,506 A | * | 11/1990 | Uddenfeldt | 455/33 |
| 5,959,980 A | * | 9/1999 | Scott | 370/280 |
| 6,101,177 A | * | 8/2000 | Bodin et al. | 370/336 |
| 6,275,486 B1 | * | 8/2001 | Edwards et al. | 370/347 |
| 6,295,285 B1 | * | 9/2001 | Whitehead | 370/329 |

FOREIGN PATENT DOCUMENTS

WO  WO9608885  3/1996  ............ H04B/7/26

* cited by examiner

Primary Examiner—Hassan Kizou
Assistant Examiner—Anh Vu H. Ly
(74) Attorney, Agent, or Firm—Dicran Halajian

(57) ABSTRACT

A method of controlling the timing of a transmission time slot within a time frame comprises transmitting information over a channel in an allocated time slot at an allocated channel frequency, measuring a received interference level at the channel frequency around the start and around the end of the time slot, analysing the measured interference levels to detect the presence or absence of interferers at the channel frequency around the start and around the end of the time slot, and, if required, adjusting the timing of subsequent time slots for the channel to reduce interference from the detected interferers.

Transmission slot timing of the invention enables dynamic avoidance of interference, which can therefore avoid both intermittent and continuous interferers, and can result in synchronisation of different systems to avoid sliding interferers. This method also enables the throughput of the communication system to be largely unaffected.

10 Claims, 2 Drawing Sheets

TIMING CONTROL OF TRANSMISSION TIME SLOT

FIELD OF THE INVENTION

This invention relates to the control of the timing of transmission time slots within a time frame for a communication system which allocates different time slots within a frame to different communication channels.

BACKGROUND OF THE INVENTION

Various multiplexing techniques for communications systems are known which involve the division of time frames into time slots for different channels. Time division duplex (TDD) is a technique for establishing full duplex communications having forward and reverse links occurring on the same frequency, but separated in time to avoid collision. Time division multiple access is a scheme whereby transmissions to or from a plurality of users are separated in time in order to avoid conflicts. It is also possible to combine time division techniques with frequency division techniques.

This invention is particularly concerned with interference which may affect a signal transmission during a given time slot, which interference arises from a different communication channel but at a similar frequency and time. Individual communication systems adopt measures for avoiding interference between different communication channels within the system. For example, in the global system for mobile communications ("GSM") each transmission time slot is surrounded by guard times to account for uncertain signal propagation delays between the base station and the user stations, in order to avoid collision of signals from different user stations. By comparing the time of the signal received from the user station to the expected received time, the base station in a GSM system may command the user station to advance or retard its transmission timing. This feature is known as adaptive frame alignment. WO 96/08885 also discloses a frame timing method for a time division system, in which transmission timing is adapted to take account of propagation delays, so as to avoid overlap between signals from multiple users at different distances.

The present invention is concerned more particularly with interference between different communication systems. For example, local area networks may have unlicensed spectrum allocation so that the same frequency band is shared by different local area network communication systems. When these systems are deployed in close proximity to each other (for example DECT communications systems in adjacent office buildings) there may be interference and co-existence problems. In particular, there may be no synchronisation of timing between the two systems so that mobile stations of the two systems may be generating signals at the same frequency and at the same time which may cause interference.

The interference levels may also change over time, as a result of so-called sliding interferers, whereby differences in clock frequencies result in timing relationships between two systems slowly changing. In the DECT system, the presence of sliding interferers is detected by testing for localised corruption of synchronisation data or by using cyclic redundancy check fields. The DECT system then enables handover to a different frequency before channel data is corrupted.

SUMMARY OF THE INVENTION

According to the invention, there is provided a method of controlling the timing of a transmission time slot within a time frame, a channel being allocated to the time slot for transmission from a transmitting station to a receiving station, comprising:

transmitting information over the channel in the time slot at an allocated channel frequency;

at the receiving station, measuring an interference level at the channel frequency around the start and around the end of the time slot;

analysing the measured interference levels to detect the presence or absence of interferers at the channel frequency around the start and around the end of the time slot;

if required, adjusting the timing of subsequent time slots for the channel to reduce interference from the detected interferers.

In the method of the invention, transmission slot timing enables dynamic avoidance of interference, which can therefore avoid both intermittent and continuous interferers. This method also enables the throughput of the communication system to be largely unaffected.

The timing of time slots within the time frame other than the time slot for the channel may also be adjusted based on the interference level analysis. At the limit, it is possible to alter the timing of all time slots within a time frame based on one detected interferer, so that the system effectively becomes synchronised with the detected interferer. Thus, the timing adjustment of the time slots may be effected by altering the clock frequency of the system.

Alternatively, the timing adjustment may comprise a shift forward in time or a shift backward in time of an individual time slot within the time frame by a predetermined amount.

The measurement around the start of the time slot may be in the preceding time slot, and the measurement around the end of the time slot may be in the succeeding time slot or in part of those time slots. This enables detection of interference immediately before and after the time slot allocated to the channel of interest. Continuous analysis of the interference levels enables determination of when an interferer is approaching the time slot of interest, for example as a result of unsynchronised system clocks in nearby communication systems.

The measurement may comprise measurement of received signal power substantially at the channel frequency, so that the total effect of other signals to the frequency band of the channel can be detected. Alternatively, the measurement may comprise bit error or signal quality measurement at the start and the end of the time slot, to measure the corruption of bits.

Timing adjustment information is preferably transmitted from the receiving station to the transmitting station, to enable the timing of subsequent transmissions to be altered.

The invention also provides a telecommunication station (a base station or a mobile user station) comprising receiving circuitry for receiving a signal at a channel frequency and in an allocated time slot within a time frame;

measuring means for measuring an interference level, at the channel frequency, of a received signal at different points in time;

analysis means for analysing measured interference levels to detect the presence or absence of interferers at the channel frequency around the start and around the end of the time slot, and for calculating a timing adjustment for the timing of subsequent time slots for the signal in order to reduce interference from detected interferers; and transmitting circuitry for transmitting time adjustment information.

The measuring means may comprise signal power measurement circuitry.

The invention further provides a telecommunication system comprising a plurality of telecommunication stations, each telecommunication station comprising:

receiving circuitry for receiving a signal at a channel frequency and in an allocated time slot within a time frame;

measuring means for measuring an interference level, at the channel frequency, of a received signal at different points in time;

analysis means for analysing measured interference levels to detect the presence or absence of interferers at the channel frequency around the start and around the end of the time slot, and for calculating a timing adjustment for the timing of subsequent time slots for the signal in order to reduce interference from detected interferers; and transmitting circuitry for transmitting time adjustment information.

BRIEF DESCRIPTION OF THE DRAWINGS

The invention will now be described by way of example, with reference to and as shown in, the accompanying drawings in which.

DETAILED DESCRIPTION OF THE INVENTION

Figure 1:
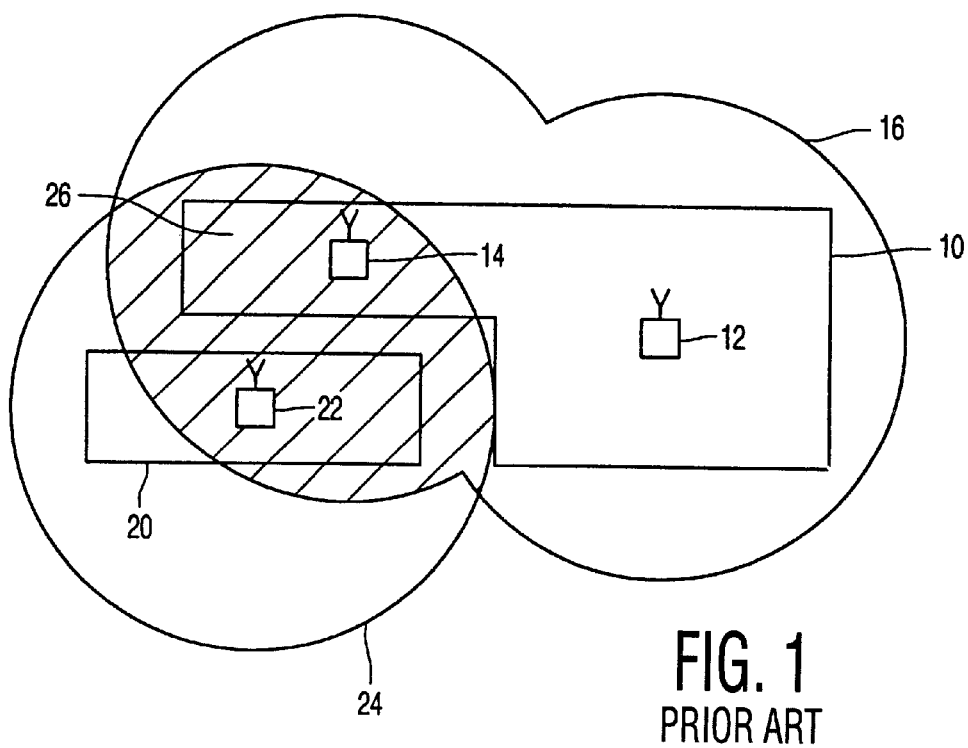
FIG. 1 illustrates one scenario leading to possible interference which can be reduced by the method of the invention.

FIG. 1 illustrates the coverage provided by two local area networks having a shared frequency band for the base stations of the two systems, which may therefore result in interference between the communication signals being transmitted within each system. An example of a present local area network is the DECT communication system.

A first office block 10 and a second office block 20 are represented in FIG. 1. The first office block 10 requires two base stations 12, 14 to provide a coverage area 16 which encompasses all parts of the building. The adjacent building 20 is provided with a single base station 22 which provides a coverage area 24 encompassing the building 20. When the two systems are deployed in an uncoordinated way, the possibility of interference and co-existence problems arises. In particular, in the hatched area 26 (which falls in both office blocks) a mobile station can receive information from both base stations 14, 22, and signals occurring at the same time and frequency will interfere with each other.

In the method of the invention, reception of a signal during an allocated time slot is accompanied with interference measurement at the beginning or before the beginning of the time slot, and at the end or after the end of the time slot. These interference measurements enable the presence of interfering signals to be detected, and the method enables the timing of the particular time slot for that communication channel to be adjusted in order to reduce the effects of those interfering signals.

Figure 2:
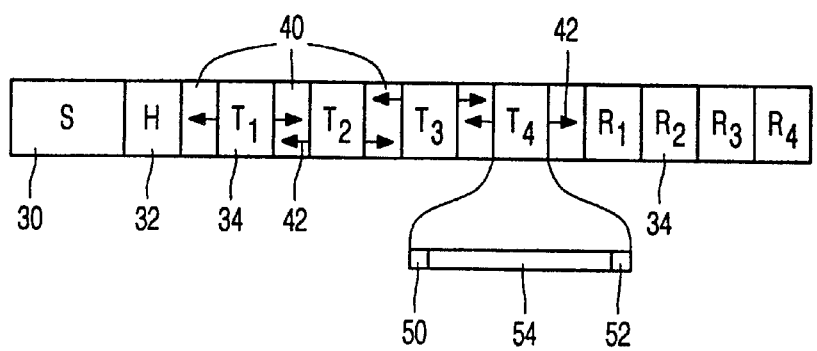
FIG. 2 shows one possible down-link transmission time frame to be employed by the system of the invention.

FIG. 2 shows one possible frame structure for use by the transmitting station when there is communication between a transmitting station and a receiving station. In the simplest example, the transmitting station is a base station and the receiving station is a mobile unit, although the method of the invention may be employed for communication in both directions.

Each base transmission has a synchronisation source 30 for the purpose of setting correct timing synchronisation between the transmitting and receiving stations.

For initiating communication between the base station and a mobile station, the time frame also includes a header 32, which indicates to the mobile station that a particular pair of time slots is unoccupied. The mobile station responds to the header in the allocated uplink time slot to initiate the communication channel. This, or other conventional call set-up routines, may be employed.

The frame also includes a number of time slots 34 allocated to the transmission of user information between the mobile and base stations. In the example of time frame shown in FIG. 2, some of the time slots $T_1$, $T_2$, $T_3$, $T_4$ are allocated for transmission by the base station and others $R_1$, $R_2$, $R_3$, $R_4$ are allocated to reception of signals by the base station. In the example shown in FIG. 2, the time slots of each associated pair (an associated pair comprising the up-link time slot and the corresponding down-link time slot for a duplex communication) are separated by approximately half the time frame duration.

Each transmission time slot T in FIG. 2 is preceded and followed by a guard time or null region 40, which preferably has a duration of up to half of the duration of each time slot. The longer the null region, the greater the loss of system capacity, so that a short null region is preferred. This enables the precise timing of each transmission slot to be adjusted, and in particular to be shifted forwards in time or backwards in time into the null region. Thus, each transmission slot is adjustable within the time frame as represented by arrows 42.

The time frame of FIG. 2 enables only the down-link time slots T to be adjustable. It is possible for the up-link reception time slots R to be adjustable, in which case the reception time slots R would also require surrounding null periods.

To enable the receiving station to have accurate information of the timing of the time slot used for transmission to the receiving station, the header 32 provides details concerning the timing of each transmission time slot.

The adjustment of the time slot positioning within the frame is selected according to interference measurements obtained at the receiving station.

These interference measurements may be obtained in a number of ways. One possibility is for the receiving station to count the number of corrupted bits at the beginning and at the end of the time slot, for example by using a cyclic redundancy check system. The number of corrupted bits provides an indication of the level of interference at the beginning and at the end of the time slot. To enable this bit analysis, each transmission time slot T may include bit sequences 50, 52 at the beginning and end of the time slot, preceding and following the user information 54. Of course, other error detection systems may be employed, and other suitable systems are employed in the DECT standard, which will be apparent to those skilled in the art.

Alternatively, the interference measurements may be performed by the receiving station in time slots preceding and following the time slot of the communication channel. A measure of the interference level may be obtained simply by measuring the received signal power within the frequency band of interest.

The interference information is sent by the receiving station to the transmitting station either during an allocated portion of the time frame (for example as part of the signal to be received during the allocated reception time slot R), or else the transmitting station may be on permanent stand-by for interference data. The interference data could be in the form of estimates of interference levels or in the form of an explicit request for timing adjustment. The transmitting station may then adjust the timing of subsequent time slots for the particular communication channel, and the timing used will be transmitted by the transmitting station in the header 32. The timing adjustment will initially involve shifting a time slot into one of the null periods 40. If the timing adjustment request from the receiving station requires a time slot to be shifted beyond the null period an into an adjacent time slot, the transmitting station has a number of options.

If the adjacent time slot is vacant, the transmission slot can be shifted into the adjacent vacant slot.

Figure 3:
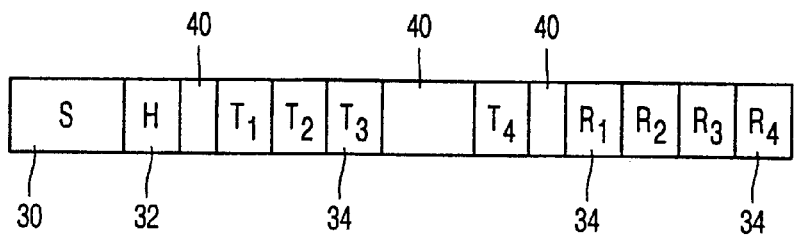
FIG. 3 shows the time frame of FIG. 2 after adaptation in response to interference information.

If the adjacent time slot is occupied, the system can examine whether it is possible also to shift the adjacent time slot effectively to enlarge the null period. Thus, the interference analysis can result in adjustment of the timing of time slots within the time frame other than the time slot for the analysed channel. In this way, the time slots can be bunched together (as shown in FIG. 3) with the null periods compounded together at the location of the detected interferer. If there are conflicting interference signals from different time slots, so that bunching of transmission slots is not possible, it may then be desirable to shift one time slot to a different area of the time frame, or to change the frequency of a particular channel.

Alternatively, when a time slot has been shifted to the edge of the null period on one side of the original time slot position, interference may be avoidable by subsequently shifting the time slot into the null period on the opposite side of the original time slot position. In this way, the sliding interferer can be considered to jump past the time slot in question. This would require wider null periods.

These approaches require an overview of the interference information from all transmission and reception time slots and results in adaptive control of the entire frame structure. Adaptive control of the entire frame structure can result in sliding interferers being avoided by effectively synchronising the conflicting systems through timing control of the time slots. Thus, the base station frequency reference which is used to generate the frame timing can effectively be adjusted by simultaneously shifting all time slots equally within the time frame. This may require the time slots to jump to different positions within the time frame when they reach the end of the time frame.

The base station clock frequency may alternatively be altered to effect timing adjustment and ensure synchronisation of the conflicting systems, with the time slots in this case maintaining the same relative positions within the time frame.

The different implementations of the method of the invention as described above do not require any vacant time slots, and can operate even with a fully loaded system.

The timing adjustment may take into account the signal strength of the desired signal, so that the interference levels measured may be compared with the received signal strength during the allocated time slot, in order to determine whether timing adjustment is required.

As stated above, the timing of transmission slots may be adjustable in both the up-link and the down-link directions, although it would be desirable to maintain a minimum time difference between receive and transmit slots for the same duplex channel. It may be desirable to dictate that adjustment of the timing of an up-link time slot and a corresponding down-link time slot should be performed in the same direction (i.e. both forwards or both backwards in time).

It is not necessary for all terminals communicating with a base station to employ the timing adjustment method. The slot timing imposed by the base station can take account of the existing interferers by using interference data from a reduced number of mobile terminals.

Figure 4:
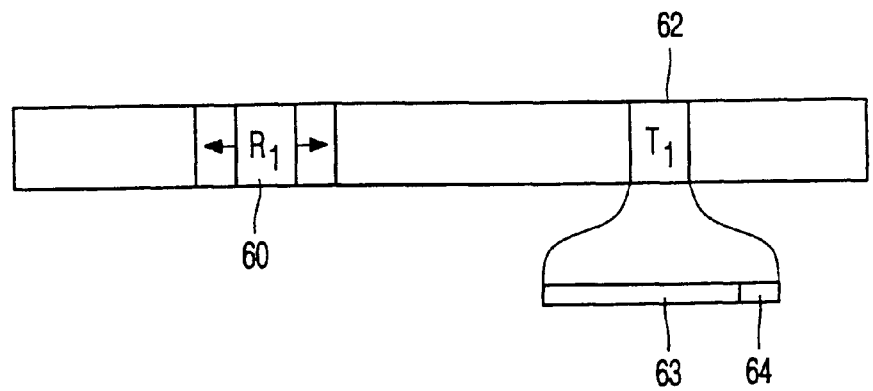
FIG. 4 shows one possible up-link transmission time frame to be employed by the system of the invention.

FIG. 4 shows a possible time frame for transmission by the receiving station to provide the interference information. The time frame includes the allocated received time slot 60 and transmit time slot 62. The interference measurement information may be conveyed as a request to alter the timing of the down-link by a calculated amount, or alternatively the interference data could be transmitted, to enable the base station to calculate the required timing adjustment. This information may, for example, be sent as part of the transmitted data T. Thus, as shown in FIG. 4, the up-link transmission T may comprise a user data section 63 and an interference data section 64. Alternatively, the interference data may be transmitted in one of the vacant time slots of the up-link time frame of FIG. 4. Each user may be allocated a particular time slot for the interference data to be transmitted, or a random scheme may be employed, which would not require synchronisation between the two stations.

The transmissions in the time slots may all be at different frequencies, or alternatively common up-link and down-link transmission frequencies may be employed. Furthermore, the use of variable length time slots and unequal division of the time frame into transmission and reception time slots could be implemented in the system to enable asymmetric traffic to be supported. The method of the invention could be implemented in existing system such as DECT, or could be implemented in future mobile radio systems, such as UMTS.

Figure 5:
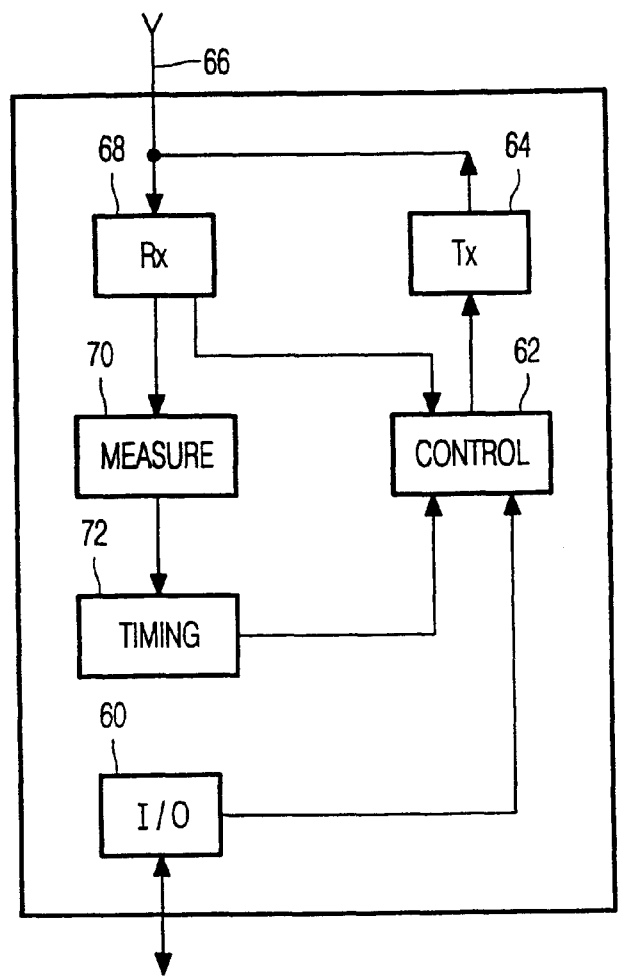
FIG. 5 shows a mobile handset of the invention.

A mobile station which can operate using the method of the invention is shown in FIG. 5. The station comprises an input/output interface which is coupled to a control unit 62 which controls the transmission parameters and coding and decoding for the input output interface 60. Information from the control unit 62 is supplied to the transmission circuitry 64 which is coupled to the antenna 66. Signals received from the antenna 66 pass to a receiving circuit 68. A measurement circuit 70 performs the interference measurements described above on the received signal transmitted by the receiving circuitry 68. The results of the measurement analysis are passed to a time delay calculation circuit 72 which prepares the appropriate data for retransmission, and supplies this information to the control unit 62.

Although the invention has been described in connection with local area networks, the technique has general applicability for interference avoidance for systems operating in noisy environments.

What is claimed is:

1. A method of controlling the timing of a transmission time slot within a time frame, a channel being allocated to the time slot for transmission from a transmitting station to a receiving station, comprising:
    transmitting information over the channel in the time slot at an allocated channel frequency;
    at the receiving station, measuring an interference level at the channel frequency around the start and around the end of the time slot;
    analysing the measured interference levels to detect the presence or absence of interferers at the channel frequency around the start and around the end of the time slot;

if required, adjusting the timing of subsequent time slots for the channel to reduce interference from the detected interferers.

2. A method as claimed in claim 1, wherein the timing of time slots within the time frame other than the time slot for the channel are adjusted based on the interference level analysis.

3. A method as claimed in claim 2, wherein the adjustment of the timing of subsequent time slots is effected by altering the clock frequency governing the time frame generation in the transmitting station.

4. A method as claimed in claim 1, wherein the timing adjustment comprises a shift forward in time or a shift backward in time for the time slot by a predetermined amount.

5. A method as claimed in claim 1, wherein the measurement around the start of time slot is in the preceding time slot, and the measurement around the end of the time slot is in the succeeding time slot.

6. A method as claimed in claim 5, wherein the measurement comprises measurement of received signal power substantially at the channel frequency.

7. A method as claimed in claim 1, wherein the measurement around the start of time slot comprises bit error measurement at the start of the time slot, and the measurement around the end of the time slot comprises bit error measurement at end of the time slot.

8. A telecommunication station comprising:

receiving circuitry for receiving a signal at a channel frequency and in an allocated time slot within a time frame;

measuring means for measuring an interference level, at the channel frequency, of a received signal at different points in time;

analysis means for analysing measured interference levels to detect the presence or absence of interferers at the channel frequency around the start and around the end of the time slot, and for calculating a timing adjustment for the timing of subsequent time slots for the signal in order to reduce interference from detected interferers; and transmitting circuitry for transmitting time adjustment information.

9. A station as claimed in claim 8, wherein the measuring means comprises signal power measurement circuitry.

10. A telecommunication system comprising a plurality of telecommunication stations, each telecommunication station comprising:

receiving circuitry for receiving a signal at a channel frequency and in an allocated time slot within a time frame;

measuring means for measuring an interference level, at the channel frequency, of a received signal at different points in time;

analysis means for analysing measured interference levels to detect the presence or absence of interferers at the channel frequency around the start and around the end of the time slot, and for calculating a timing adjustment for the timing of subsequent time slots for the signal in order to reduce interference from detected interferers; and transmitting circuitry for transmitting time adjustment information.

\* \* \* \* \*